United States Patent
Liu

(10) Patent No.: US 10,606,104 B2
(45) Date of Patent: Mar. 31, 2020

(54) DISPLAY DEVICE COMPRISING A PRIVACY MECHANISM HAVING MOVABLE TRANSPARENT PARTICLES IN A CAVITY BODY TO FORM A LENS-LIKE STRUCTURE CAPABLE OF NARROWING A DISPLAY VIEW ANGLE

(71) Applicant: BOE TECHNOLOGY GROUP CO., LTD., Beijing (CN)

(72) Inventor: Jiantao Liu, Beijing (CN)

(73) Assignee: BOE TECHNOLOGY GROUP CO., LTD., Beijing (CN)

( * ) Notice: Subject to any disclaimer, the term of this patent is extended or adjusted under 35 U.S.C. 154(b) by 0 days.

(21) Appl. No.: 15/564,118

(22) PCT Filed: Apr. 27, 2017

(86) PCT No.: PCT/CN2017/082177
§ 371 (c)(1),
(2) Date: Oct. 3, 2017

(87) PCT Pub. No.: WO2017/215356
PCT Pub. Date: Dec. 21, 2017

(65) Prior Publication Data
US 2019/0107741 A1    Apr. 11, 2019

(30) Foreign Application Priority Data
Jun. 17, 2016    (CN) .......................... 2016 1 0438809

(51) Int. Cl.
*G02F 1/13*     (2006.01)
*G02F 1/167*    (2019.01)
(Continued)

(52) U.S. Cl.
CPC ......... *G02F 1/1323* (2013.01); *G02B 5/0242* (2013.01); *G02B 6/003* (2013.01);
(Continued)

(58) Field of Classification Search
CPC . G02F 1/1323; G02F 2201/44; G02F 2203/62
See application file for complete search history.

(56) References Cited

U.S. PATENT DOCUMENTS

2006/0077556 A1    4/2006  Li et al.
2006/0103779 A1*   5/2006  Amemiya ......... G02F 1/133524
                                                 349/95
(Continued)

FOREIGN PATENT DOCUMENTS

CN    100412936 C    8/2008
CN    102141707 A    8/2011
(Continued)

OTHER PUBLICATIONS

First Office Action for Chinese Application No. 201610438809.1, dated Nov. 28, 2016, 6 Pages.
(Continued)

*Primary Examiner* — Paul C Lee
(74) *Attorney, Agent, or Firm* — Brooks Kushman P.C.

(57) ABSTRACT

The present disclosure provides a display device, including a display panel, having a display surface on which a peep-proof mechanism is arranged, wherein the peep-proof mechanism includes: a cavity body arranged on the display surface of the display panel, the cavity body having a first transparent surface away from a first side of the display panel; transparent particles, which are movable in the cavity body; and a control mechanism, for controlling the peep-proof mechanism to be in a first state in which the transparent particles are adsorbed on the first transparent surface, so as to from a lens-like structure capable of narrowing a display view angle of the display panel.

16 Claims, 2 Drawing Sheets

(51) Int. Cl.
*F21V 8/00* (2006.01)
*G02B 5/02* (2006.01)
*G02F 1/1335* (2006.01)
*G02F 1/1343* (2006.01)

(52) U.S. Cl.
CPC .. *G02F 1/133526* (2013.01); *G02F 1/134309* (2013.01); *G02F 1/167* (2013.01); *G02F 2001/133607* (2013.01); *G02F 2201/44* (2013.01); *G02F 2203/62* (2013.01)

(56) References Cited

U.S. PATENT DOCUMENTS

| | | | |
|---|---|---|---|
| 2009/0153783 A1 | 6/2009 | Umemoto | |
| 2012/0013825 A1 | 1/2012 | Sugiura et al. | |
| 2012/0250141 A1* | 10/2012 | Chen | G02B 1/06 359/320 |

FOREIGN PATENT DOCUMENTS

| | | | | |
|---|---|---|---|---|
| CN | 204790254 U | 11/2015 | | |
| CN | 105353539 A | 2/2016 | | |
| CN | 105607315 A | 5/2016 | | |
| CN | 105866990 A | 8/2016 | | |
| JP | 2006284673 A | 10/2006 | | |
| JP | 2007333867 A | 12/2007 | | |
| TW | 201423223 A | 6/2014 | | |
| WO | WO-2012071974 A1 * | 6/2012 | ........... G02B 5/0226 |
| WO | WO-2014003331 A1 * | 1/2014 | | |

OTHER PUBLICATIONS

International Search Report and Written Opinion for Application No. PCT/CN2017/082177, dated Aug. 1, 2017, 11 Pages.

Search Report for Chinese Application No. 201610438809.1, dated Sep. 22, 2016, 7 Pages.

* cited by examiner

DISPLAY DEVICE COMPRISING A PRIVACY MECHANISM HAVING MOVABLE TRANSPARENT PARTICLES IN A CAVITY BODY TO FORM A LENS-LIKE STRUCTURE CAPABLE OF NARROWING A DISPLAY VIEW ANGLE

CROSS-REFERENCE TO RELATED APPLICATIONS

This application is the U.S. national phase of PCT Application No. PCT/CN2017/082177 filed on Apr. 27, 2017, which claims priority to Chinese Patent Application No. 201610438809.1 filed on Jun. 17, 2016, which are incorporated herein by reference in their entireties.

TECHNICAL FIELD

The disclosure relates to the field of display technology, and in particular to a display device.

BACKGROUND

In the field of display technology, there is an increasingly high demand, from a user, for confidentiality of a liquid crystal display device upon displaying information. In a related art, the confidentiality of the liquid crystal display device may be realized by arranging a polarizer (such as a lower polarizer) on a liquid crystal panel of the liquid crystal display device, and integrating an upper polarizer onto a pair of specific-purpose spectacles. To be specific, in the case of using the liquid crystal display device with the lower polarizer to display, a ray of light of a backlight passes through a liquid crystal layer in the liquid crystal panel after being polarized by the lower polarizer, and then emits from the liquid crystal panel. What an observer who does not wear the pair of specific-purpose spectacles with the upper polarizer will see may be an entire white display area of the liquid crystal panel of the liquid crystal device. That is, said observer cannot see any effective image information, thereby improving the confidentiality of the liquid crystal display device upon displaying. However, in a spectacle-type peep-proof device, due to the polarizer, a brightness of the display device is reduced and it is not convenient for a user to wear spectacles.

SUMMARY

An object of the present disclosure is to provide a display device which may improve the confidentiality of the display device upon displaying by arranging a peep-proof mechanism on a display panel.

The technical solution according to the present disclosure is as follows.

A display device includes a display panel, having a display surface on which a peep-proof mechanism is arranged, wherein the peep-proof mechanism includes: a cavity body arranged on the display surface of the display panel, the cavity body having a first transparent surface away from a first side of the display panel; transparent particles, which are movable in the cavity body; and a control mechanism, for controlling the peep-proof mechanism to be in a first state in which the transparent particles are adsorbed on the first transparent surface, so as to from a lens-like structure capable of narrowing a display view angle of the display panel.

Optionally, a receiving groove is formed at a position of the cavity body close to a second side of the display panel and outside a display area of the display panel; and the control mechanism is further configured to control the peep-proof mechanism to be in a second state in which the transparent particles are received within the receiving groove.

Further, the control mechanism is further configured to control the transparent particles to move towards and be adsorbed on the first transparent surface, so as to enable the peep-proof mechanism to be switched from a non-first state to the first state; or the control mechanism is further configured to control the transparent particles to move towards and be received within the receiving groove, so as to enable the peep-proof mechanism to be switched from a non-second state to the second state.

Further, the control mechanism includes an electric field excitation unit configured to generate an electric field in the cavity body. The transparent particles are charged transparent particles. The control mechanism is configured to control the charged transparent particles to move towards and be adsorbed on the first transparent surface under the effect of a first electric field generated by the electric field excitation unit, or to control the charged transparent particles to move towards and be received within the receiving groove under the effect of a second electric field generated by the electric field excitation unit.

Optionally, the first transparent surface has a concave structure with a middle part depressed in a direction close to the display panel, such that in the first state, the transparent particles are adsorbed on the first transparent surface so as to form a concave lens-like structure.

Optionally, the first transparent surface is formed by a first transparent electrode, and in the first state, a polarity of the first transparent electrode is opposite to that of the charged transparent particles under the control of the electric field excitation unit.

Optionally, at least one inner wall of a body of the receiving groove is formed by a second transparent electrode, and in the second state, a polarity of the second transparent electrode is opposite to that of the charged transparent particles under the control of the electric field excitation unit.

Optionally, the receiving groove is formed around the display panel, or is formed at one side or two opposite sides of the display panel.

Optionally, the cavity body has a second transparent surface which is close to a second side of the display panel and covers the display area of the display panel, and the receiving groove is located outside the second transparent surface and at the side of the second transparent surface close to the display panel.

Optionally, the second transparent surface has a convex structure that is capable of guiding the transparent particles into the receiving groove and has a middle part protruding in a direction away from the display panel.

Optionally, in the case that the peep-proof mechanism is in the first state, the transparent particles are adsorbed at an edge area around the first transparent surface, to form the lens-like structure.

Further, the edge area around the first transparent surface is formed by a third transparent electrode, and in the first state, a polarity of the third transparent electrode is opposite to that of the charged transparent particles under the control of the electric field excitation unit in the control mechanism, such that the charged transparent particles are adsorbed at the edge area around the first transparent surface, to form the lens-like structure.

Optionally, in the first state, the transparent particles adsorbed at the edge area around the first transparent surface have a density greater than the transparent particles adsorbed at the middle area of the first transparent surface.

The present disclosure brings about the following advantageous effects.

The display device according to the present disclosure has a peep-proof state and a non-peep-proof state by the arrangement of a peep-proof mechanism. By controlling a moving direction of the transparent particles, the transparent particles are adsorbed on the first transparent surface and a lens-like structure is formed at a light emitting side of the display panel, such that the peep-proof mechanism is in a peep-proof state (that is, the first state) and the display view angle is narrowed down so as to prevent the image information from being peeped. By controlling a moving direction of the transparent particles, the transparent particles are received within the receiving groove, such that the peep-proof mechanism is in a non-peep-proof state (that is, the second state). Accordingly, no ray of light from the display panel is blocked, and a normal view angle may be displayed.

DETAILED DESCRIPTION

In order to make the objects, the technical solutions and the advantages of the present disclosure more apparent, the present disclosure will be described hereinafter in a clear and complete manner in conjunction with the drawings and embodiments. Obviously, the following embodiments are merely a part of, rather than all of, the embodiments of the present disclosure. Based on these embodiments of the present disclosure, a person skilled in the art may obtain the other embodiments, which also fall within the scope of the present disclosure.

The embodiment of the present disclosure provides a display device, including a display panel that has a display surface on which a peep-proof mechanism is arranged. The peep-proof mechanism includes: a cavity body arranged on the display surface of the display panel, transparent particles which are movable in the cavity body, and a control mechanism. The cavity body has a first transparent surface away from a first side of the display panel; the control mechanism is configured to control the peep-proof mechanism to be in a first state in which the transparent particles are adsorbed on the first transparent surface, so as to from a lens-like structure capable of narrowing a display view angle of the display panel. The embodiments of the present disclosure are below introduced in detail in combination with the accompanying drawings.

Figure 1:
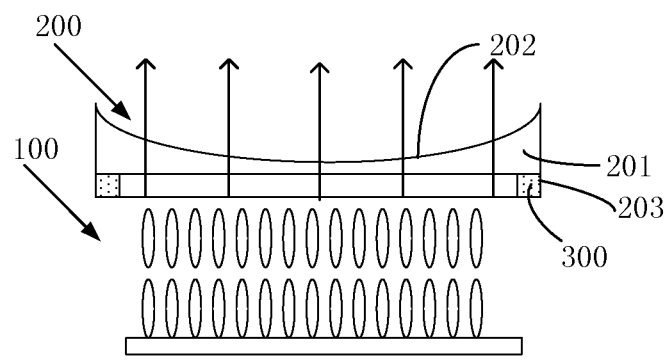
FIG. 1 is a structural schematic diagram of a display device in a second state according to some embodiments of the present disclosure.
Figure 2:
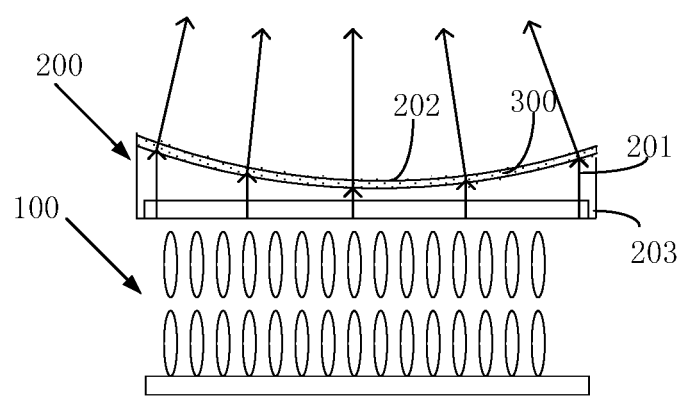
FIG. 2 is a structural schematic diagram of a display device in a first state according to some embodiments of the present disclosure.

As shown in FIGS. 1 and 2, according to some embodiments of the present disclosure, a display device is provided, including a display panel 100, and a peep-proof mechanism 200, arranged on a display surface of the display panel 100 and used for narrowing a display view angle of the display panel 100.

The peep-proof mechanism 200 includes: a cavity body 201 arranged on the display surface of the display panel 100, the cavity body 201 having a first transparent surface 202 away from a first side of the display panel 100; transparent particles 300, which are movable in the cavity body 201; and a control mechanism.

Further, a receiving groove 203 is formed at a position of the cavity body 201 close to a second side of the display panel 100 and outside a display area of the display panel 100.

Optionally, the peep-proof mechanism 200 may have a first state and a second state. The control mechanism is configured to control the peep-proof mechanism 200 to be in a first state in which the transparent particles are adsorbed on the first transparent surface, so as to from a lens-like structure capable of narrowing a display view angle of the display panel, schematically, referring to FIG. 2. Or, the control mechanism is further configured to control the peep-proof mechanism to be in the second state in which the transparent particles are received within the receiving groove, schematically, referring to FIG. 1.

The control mechanism may further control the movement of the transparent particles 300. For example, the transparent particles 300 move towards and be adsorbed on the first transparent surface 202 under the control of the control mechanism, so as to enable the peep-proof mechanism to be switched from a non-first state (e.g., the second state) to the first state, thereby forming a lens-like structure capable of narrowing a display view angle of the display panel 100. For another example, the transparent particles 300 move towards and are received within the receiving groove 203 under the control of the control mechanism, so as to enable the peep-proof mechanism to be switched from a non-second state (e.g., the first state) to the second state.

The display device provided by the present disclosure has a peep-proof state and a non-peep-proof state by the arrangement of the peep-proof mechanism 200, and a state transition may be implemented by controlling the movement of the transparent particles 300. In the peep-proof state (i.e., the first state), the transparent particles 300 may be adsorbed on the first transparent surface 202, and a lens-like structure is formed at a light emitting side of the display panel 100, such that the display view angle is narrowed down so as to prevent the image information from being peeped. In the non-peep-proof state (i.e., the second state), the transparent particles 300 are received within the receiving groove 203, such that no ray of light from the display panel 100 is blocked, and the normal view angle may be displayed.

In the display device according to the embodiment of the present disclosure, preferably, as shown in FIGS. 1 and 2, the control mechanism includes: an electric field excitation unit configured to generate an electric field in the cavity body 201. The transparent particles 300 are charged transparent particles.

In the first state, the charged transparent particles move towards and are adsorbed on the first transparent surface 202 in the electric field generated under the control of the electric field excitation unit, so as to form a lens-like structure capable of narrowing a display view angle of the display panel 100;

in the second state, the charged transparent particles move towards and are received within the receiving groove 203 in the second electric field generated under the control of the electric field excitation unit.

By adopting the above solution, the first electric field may be generated in the cavity body 201 by the control of the electric field excitation unit, thereby controlling the charged transparent particles to move towards the first transparent surface 202, such that the peep-proof mechanism is in the peep-proof state. Or, the second electric field may be generated in the cavity body 201 by the control of the electric field excitation unit, thereby controlling the charged transparent particles to move towards the receiving groove 203, such that the peep-proof mechanism is in the non-peep-proof state.

According to some embodiments of the present disclosure, preferably, the first transparent surface 202 is formed by a first transparent electrode, and in the first state, a polarity of the first transparent electrode is opposite to that of the charged transparent particles under the control of the electric field excitation unit. At least one inner wall of a body of the receiving groove 203 is formed by a second transparent electrode, and in the second state, a polarity of the second transparent electrode is opposite to that of the charged transparent particles under the control of the electric field excitation unit.

By adopting the above solution, the charged transparent particles move towards and are adsorbed on the first transparent electrode due to the polarity of the charged transparent particles opposite to that of the first transparent electrode, such that the peep-proof mechanism is in the first state. The charged transparent particles move towards and are received within the receiving groove 203 due to the polarity of the charged transparent particles opposite to that of the inner wall of the receiving groove 203, such that the peep-proof mechanism is in the second state.

The charged transparent particles may be positively charged or negatively charged. The charged transparent particles may be charged transparent capsules.

It should be noted that the control mechanism may be implemented by other structures in other embodiments according to the present disclosure. For example, the control mechanism may further generate a magnetic field in the cavity body 201. The transparent particles 300 may be magnetic transparent particles. Under the control of the control mechanism, a first magnetic field is generated in the cavity body 201, and the magnetic transparent particles move towards and are adsorbed on the first transparent surface 202, so as to be in the first state. Under the control of the control mechanism, a second magnetic field is generated in the cavity body 201, and the magnetic transparent particles move towards and are received within the receiving groove 203, so as to be in the second state.

In some embodiment according to the present disclosure, as shown in FIGS. 1 and 2, the first transparent surface 202 has a concave structure with a middle part depressed in a direction close to the display panel 100. In the first state, the charged transparent particles are adsorbed on the first transparent surface 202, to form a concave lens-like structure, as shown in FIG. 2.

With the above solution, by designing the first transparent surface 202 into a concave surface, a concave lens-like structure may be formed after the charged transparent particles are adsorbed on the first transparent surface 202. As shown in FIG. 2, the concave lens-like structure narrows an angle of the ray of light emitting from the display panel 100, thereby realizing the peep-proof effect.

In addition, it should be noted that, in the above solution, it is a concave lens-like structure that is formed on the first transparent surface 202, so as to realize the peep-proof effect. In other embodiments according to the present disclosure, less light is emitted from the edge area around the first transparent surface 202 by aggregating the transparent particles 300 at the edge around the first transparent surface 202, instead of aggregating the transparent particles 300 at the middle area of the first transparent surface 202, or by making the transparent particles 300 aggregated at the middle area of the first transparent surface 202 with a density less than the transparent particles 300 aggregated at the edge area, so as to realize the peep-proof effect.

Specifically, in another embodiment according to the present disclosure, the edge area around the first transparent surface 202 is formed by a third transparent electrode, and in the first state, a polarity of the third transparent electrode is opposite to that of the charged transparent particles under the control of the electric field excitation unit in the control mechanism, such that the charged transparent particles are adsorbed at the edge area around the first transparent surface 202, to form the lens-like structure.

With the above solution, the charged transparent particles may be adsorbed at the edge area around the first transparent surface 202, such that less light is emitted from the edge area, and the peep-proof effect is realized.

Additionally, in a preferable embodiment according to the present disclosure, the receiving groove 203 is formed around the display panel 100. With the above solution, the receiving groove 203 is arranged around the display panel 100, and the transparent particles 300 may move onto the first transparent surface 202 from the periphery of the display panel 100. It should be understood that the receiving groove 203 may be also only arranged at one side or two opposite sides of the display panel 100, or the like, in other embodiments according to the present disclosure.

Figure 3:
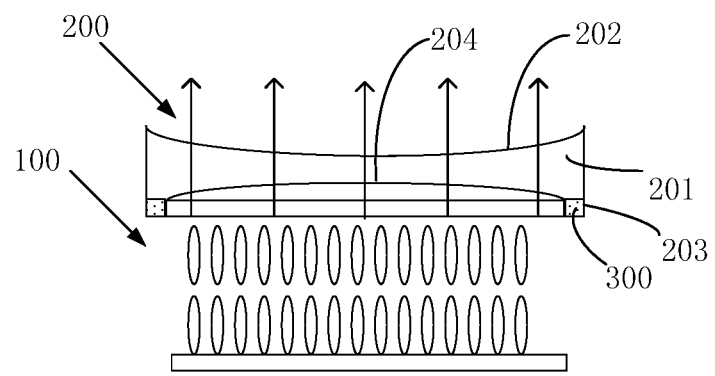
FIG. 3 is a structural schematic diagram of a display device in a second state according to some embodiments of the present disclosure.

In addition, in a preferable embodiment according to the present disclosure, the cavity body 201 has a second transparent surface which is close to the second side of the display panel 100 and covers a display area of the display panel 100, the receiving groove 203 is located outside the second transparent surface and at the side of the second transparent surface close to the display panel 100. The second transparent surface has a convex structure capable of guiding the charged transparent particles into the receiving groove 203 and has a middle part protruding in a direction away from the display panel 100 (the second transparent surface 204 as shown in FIG. 3).

With the above solution, by designing the second transparent surface into a convex surface, the transparent particles 300 may be guided, and in the second state, the transparent particles 300 may be guided into the receiving groove 203.

The above is only optional embodiments of the present disclosure, it should be noted that several improvements and modifications may be made for a person skilled in the art without departing from the principle of the present disclosure, and also should be considered to fall within the protection scope of the present disclosure.

What is claimed is:
1. A display device, comprising:
a display panel, having a display surface on which a peep-proof mechanism is arranged, wherein the peep-proof mechanism comprises:
a cavity body arranged on the display surface of the display panel, the cavity body having a first transparent surface away from a first side of the display panel;
transparent particles, which are movable in the cavity body; and
a control mechanism configured to control the peep-proof mechanism to be in a first state, to enable the transpar- ent particles adsorbed at an edge area around the first transparent surface to have a density greater than the transparent particles adsorbed at a middle area of the first transparent surface, wherein the transparent particles are adsorbed on the first transparent surface, so as to from a lens-like structure capable of narrowing a display view angle of the display panel.

2. The display device according to claim 1, wherein a receiving groove is formed at a position of the cavity body close to a second side of the display panel and outside a display area of the display panel; and the control mechanism is further configured to control the peep-proof mechanism to be in a second state in which the transparent particles are received within the receiving groove.

3. The display device according to claim 2, wherein the control mechanism is further configured to control the transparent particles to move towards and be adsorbed on the first transparent surface, so as to enable the peep-proof mechanism to be switched from a non-first state to the first state; or the control mechanism is further configured to control the transparent particles to move towards and be received within the receiving groove, so as to enable the peep-proof mechanism to be switched from a non-second state to the second state.

4. The display device according to claim 3, wherein the control mechanism comprises an electric field excitation unit configured to generate an electric field in the cavity body;

the transparent particles are charged transparent particles; and the control mechanism is further configured to control the charged transparent particles to move towards and be adsorbed on the first transparent surface under the effect of a first electric field generated by the electric field excitation unit, or to control the charged transparent particles to move towards and be received within the receiving groove under the effect of a second electric field generated by the electric field excitation unit.

5. The display device according to claim 4, wherein the first transparent surface is formed by a first transparent electrode, and in the first state, a polarity of the first transparent electrode is opposite to that of the charged transparent particles under the control of the electric field excitation unit.

6. The display device according to claim 4, wherein at least one inner wall of a body of the receiving groove is formed by a second transparent electrode, and in the second state, a polarity of the second transparent electrode is opposite to that of the charged transparent particles under the control of the electric field excitation unit.

7. The display device according to claim 2, wherein the receiving groove is formed around the display panel, or is formed at one side or two opposite sides of the display panel.

8. The display device according to claim 2, wherein the cavity body has a second transparent surface which is close to a second side of the display panel and covers the display area of the display panel, and the receiving groove is located outside the second transparent surface and at the side of the second transparent surface close to the display panel.

9. The display device according to claim 8, wherein the second transparent surface has a convex structure that is capable of guiding the transparent particles into the receiving groove and has a middle part protruding in a direction away from the display panel.

10. The display device according to claim 1, wherein the first transparent surface has a concave structure with a middle part depressed in a direction close to the display panel, such that in the first state, the transparent particles are adsorbed on the first transparent surface so as to form a concave lens-like structure.

11. The display device according to claim 1, wherein in the case that the peep-proof mechanism is in the first state, the transparent particles are adsorbed at an edge area around the first transparent surface, to form the lens-like structure.

12. The display device according to claim 11, wherein the edge area around the first transparent surface is formed by a third transparent electrode, and in the first state, a polarity of the third transparent electrode is opposite to that of the charged transparent particles under the control of the electric field excitation unit in the control mechanism, such that the charged transparent particles are adsorbed at the edge area around the first transparent surface, to form the lens-like structure.

13. The display device according to claim 6, wherein the cavity body has a second transparent surface which is close to a second side of the display panel and covers the display area of the display panel, and the receiving groove is located outside the second transparent surface and at the side of the second transparent surface close to the display panel.

14. The display device according to claim 13, wherein the second transparent surface has a convex structure that is capable of guiding the transparent particles into the receiving groove and has a middle part protruding in a direction away from the display panel.

15. The display device according to claim 14, wherein the first transparent surface has a concave structure with a middle part depressed in a direction close to the display panel, such that in the first state, the transparent particles are adsorbed on the first transparent surface so as to form a concave lens-like structure.

16. The display device according to claim 15, wherein in the case that the peep-proof mechanism is in the first state, the transparent particles are adsorbed at an edge area around the first transparent surface, to form the lens-like structure.

* * * * *